INVENTOR.
Thomas E. Bjorn.
By Norton Lesser
Attorney.

March 10, 1970 T. E. BJORN 3,499,329
MECHANICAL WHEEL BALANCER
Filed Sept. 19, 1966 7 Sheets-Sheet 1

INVENTOR.
Thomas E. Bjorn.

By Norton Lesser,
Attorney

March 10, 1970     T. E. BJORN     3,499,329

MECHANICAL WHEEL BALANCER

Filed Sept. 19, 1966     7 Sheets-Sheet 3

INVENTOR
Thomas E. Bjorn.

By Norton Lesser

Attorney

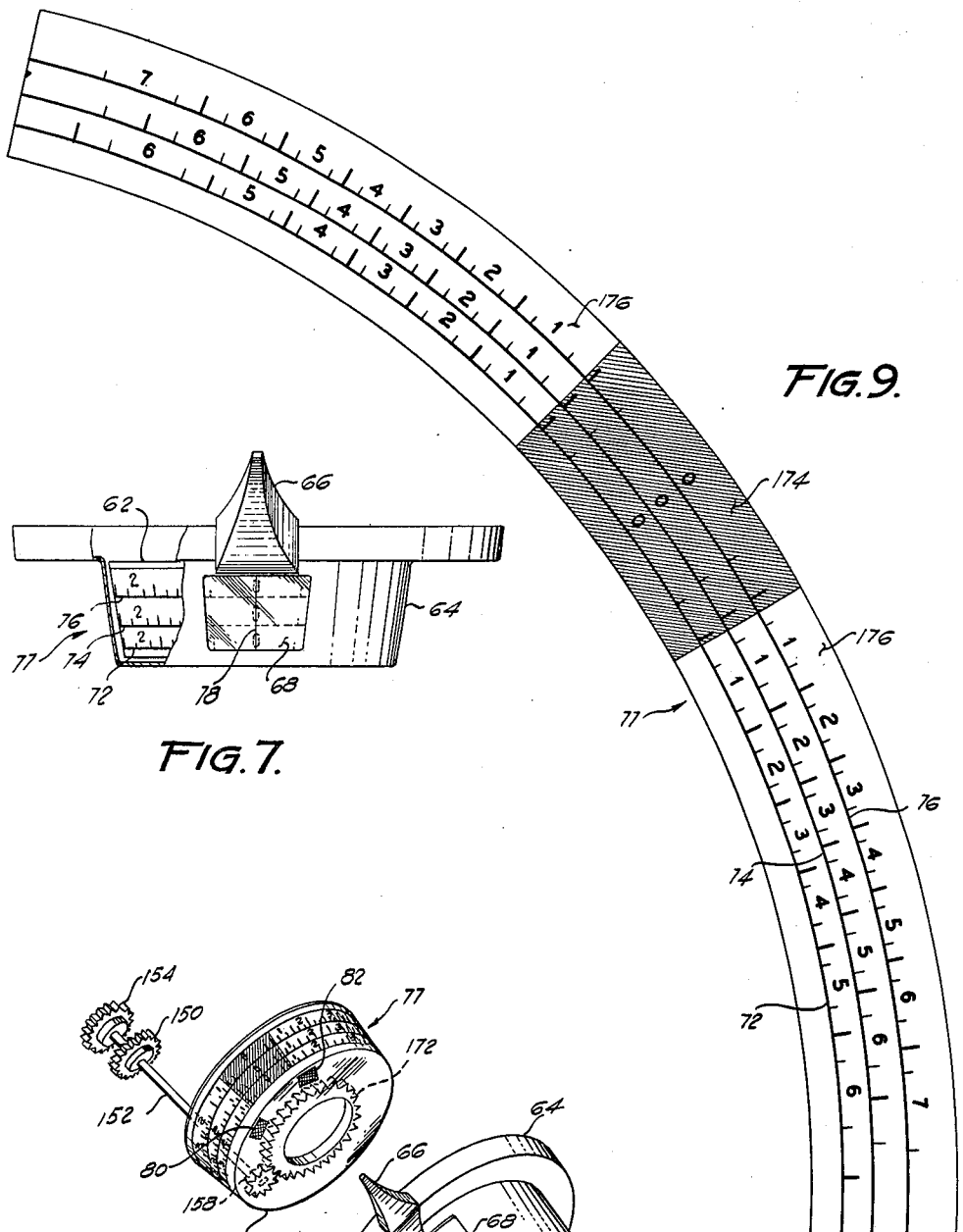

INVENTOR.
Thomas E. Bjorn.

March 10, 1970 T. E. BJORN 3,499,329
MECHANICAL WHEEL BALANCER
Filed Sept. 19, 1966 7 Sheets-Sheet 6

INVENTOR
Thomas E. Bjorn.

March 10, 1970 T. E. BJORN 3,499,329
MECHANICAL WHEEL BALANCER
Filed Sept. 19, 1966 7 Sheets-Sheet 7

INVENTOR
Thomas E. Bjorn.

United States Patent Office 3,499,329
Patented Mar. 10, 1970

3,499,329
MECHANICAL WHEEL BALANCER
Thomas E. Bjorn, Northbrook, Ill., assignor to Stewart-Warner Corporation, Chicago, Ill., a corporation of Virginia
Continuation-in-part of application Ser. No. 501,817, Oct. 22, 1965. This application Sept. 19, 1966, Ser. No. 586,914
Int. Cl. G01m 1/00
U.S. Cl. 73—458                                    5 Claims

ABSTRACT OF THE DISCLOSURE

A mechanical wheel balancing device attachable to a vehicle wheel having manually manipulatable weight arms therewithin to provide a counterbalance against an unbalance in the vehicle wheel. The weight arms are shaped with offset portions such that the center of mass of the weight arms and the respective weights carried on their ends lie in a common radial plane. Worm gear and wheel trains are provided for driving the balance weight arms and provisions are made for scale readings of the necessary compensating weight corresponding to different size vehicle wheels. In one embodiment special indicia are provided on the readout scale to prevent ambiguities in the location of a compensating weight to be added.

---

This application is a continuation-in-part of United States patent application Ser. No. 501,817, filed Oct. 22, 1965, now abandoned.

The invention relates in general to mechanical wheel balancers and more particularly to mechanical wheel balancers characterized by improved indicating means, balancing facilities and ease of manipulation.

Mechanical wheel balancers are mounted on and rotated with a vehicle wheel for indicating the location and amount of unbalance weight in the wheel. Adjustable weights on the balancer are used to apply a range of resultant weights to the wheel for determining the location and amount of an unbalance weight. While the wheel is rotated, the resultant weight is manually adjusted both as to location and amount, until the resultant weight provides a correction weight that compensates for the unbalance weight and the wheel is balanced. The relative balance and unbalance conditions are usually noted simply by feeling or otherwise detecting the minimum amplitude of vibration in the vehicle. The location and amount of the resultant weight corresponding to the correction weight necessary to balance the wheel are noted by reference to a pointer and scale, respectively, on the balancer and a weight corresponding to the correction weight is then added to the wheel at a position indicated by the pointer.

The wheels usually range in nominal diameter from 13 to 15 inches with the effect of the unbalance weight being a function of the wheel diameter. The same resultant weight, which balances one unbalance weight on a 13-inch wheel, balances another unbalance weight on a 14-inch wheel and still another unbalance weight on a 15-inch wheel. To adapt the wheel balancer to wheels of different diameter it is therefore necessary to correlate the various resultant weights to the wheel diameter in order to indicate the proper correction weight for each diameter wheel. In the present invention this is done by providing the balancer with a plurality of concentric scales, each individual to a different wheel diameter for indicating a correction weight corresponding to the wheel diameter.

In addition, provision is made in the present invention for the relevant portion of the scales to appear in a generally horizontal plane where they are more easily read.

Accordingly, it is one object of the present invention to provide a mechanical wheel balancer with facilely readable scales for indicating correction weights individually corresponding to different wheel diameters for balancing wheels of respective diameter.

Another problem in mechanical balancers arises from the desirability of providing two balancer weights adjustable in opposite directions to each other and rotatable past each other for controlling the resultant weight. It will be appreciated that the weights are rotating with the wheel at rather high speed, and that manual control must be effected through a gear reduction system, which permits the operator to adjust the angular position of the weights in opposite directions. Due to the limited space, the use of ordinary gear drives requiring large diameter gears or separate worm drives for the two weights is undesirable, and accordingly a tandem connection of several worm gears and worm wheels in a single drive is utilized for adjusting the angular position of a pair of weight arms in opposite directions to each other to control the resultant weight.

It is, therefore, another object of the present invention to provide an improved gear system in a mechanical wheel balancer for controlling the angular position of a pair of balancer weight arms which are rotatable past each other.

The weight arms each carry a weight is radially displaced from the axis of rotation and must be rotatable past each other while maintained in close axial proximity. For this purpose the balancer utilizes light-weight, aluminum arms, each having an offset portion which serves to strenghten the arm and to bring the center of mass of each arm and weight in a common radial plane while still allowing rotation of the weights past each other.

It is, therefore, another object of the present invention to provide an improved pair of weight arm structures for a mechanical wheel balancer in which the weight arm structures are rotatable past each other and have their centers of mass in a common plane.

It is still a further object of the present invention to maximize the effective balancer weight for extending the range of unbalanced wheel conditions which may be detected by the balancer.

Manual control of the balancer is exercised through a pair of coaxial shafts which are movable axially to control respective cone clutches. The shafts each have a handle or knob in axially spaced apart positions external to the balancer and the knobs are grasped alternately for operating the shafts. In grasping the inner knob, the operator's hand overlaps and often engages the outer knob, causing the associated shaft to engage the respective cone clutch and upset the adjustment made thereby.

It is, therefore, another object of the present invention to provide an improved knob assembly for avoiding inadvertent movement of the adjustment shafts of a mechanical wheel balancer.

A balancer which is constructed so that its counterbalance weight means may be continuously cycled through maximum and minimum values presents certain ambiguities in read out unless a fixed weight is provided to cooperate with the counterbalance weight means. Without the fixed weight the counterbalance weight means has two positions for each value of resultant weight, these two positions being displaced from one another by 180° angular degrees. There is no problem in manipulating such a balancer until the resultant weight counteracts the unbalance of the wheel but a problem does exist in determining which side of the wheel the lead weight should be fixed.

It is thus an object of this invention to provide simple read out indicia which will indicate the proper position for adding the lead weight. To this end a pair of locus pointers are provided on the mechanical wheel balancer displaced 180° from each other. The pointers are different in appearance, preferably by color. Means associated with the amount indicator are also provided to establish which of the pointers is to be used.

Other objects and features of this invention will become apparent on examination of the following specification and claims, together with the drawings wherein:

FIG. 7 illustrates one relationship between the indicating drum scales and pointer housing;

FIG. 8 is an exploded perspective of the pointer housing and indicating drum;

FIG. 9 illustrates the scale strip prior to mounting on the indicator drum;

Figure 2:
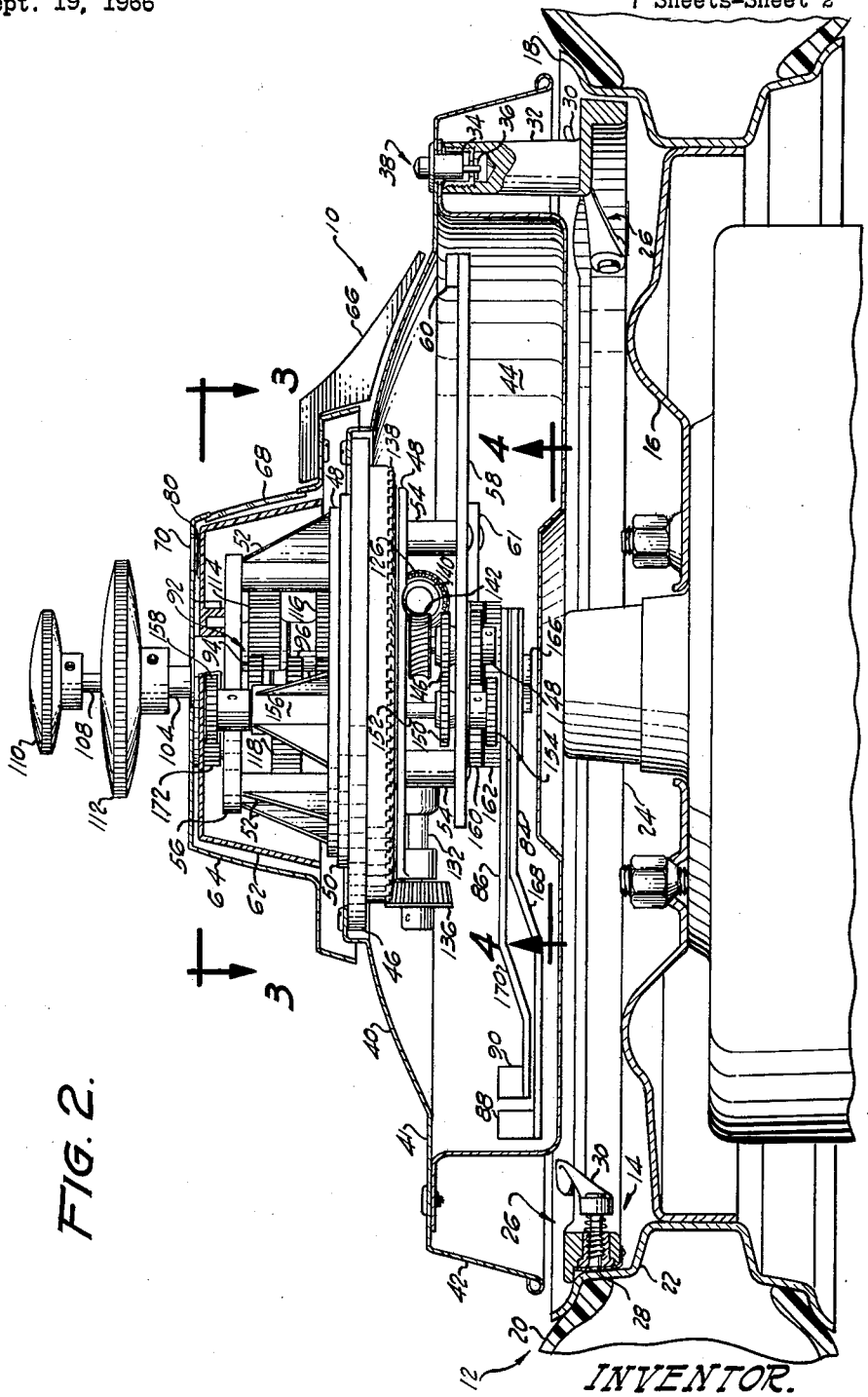
FIG. 2 is a sectional side elevational view of the balancer taken generally along the line 2—2 in FIG. 1.
Figure 1:
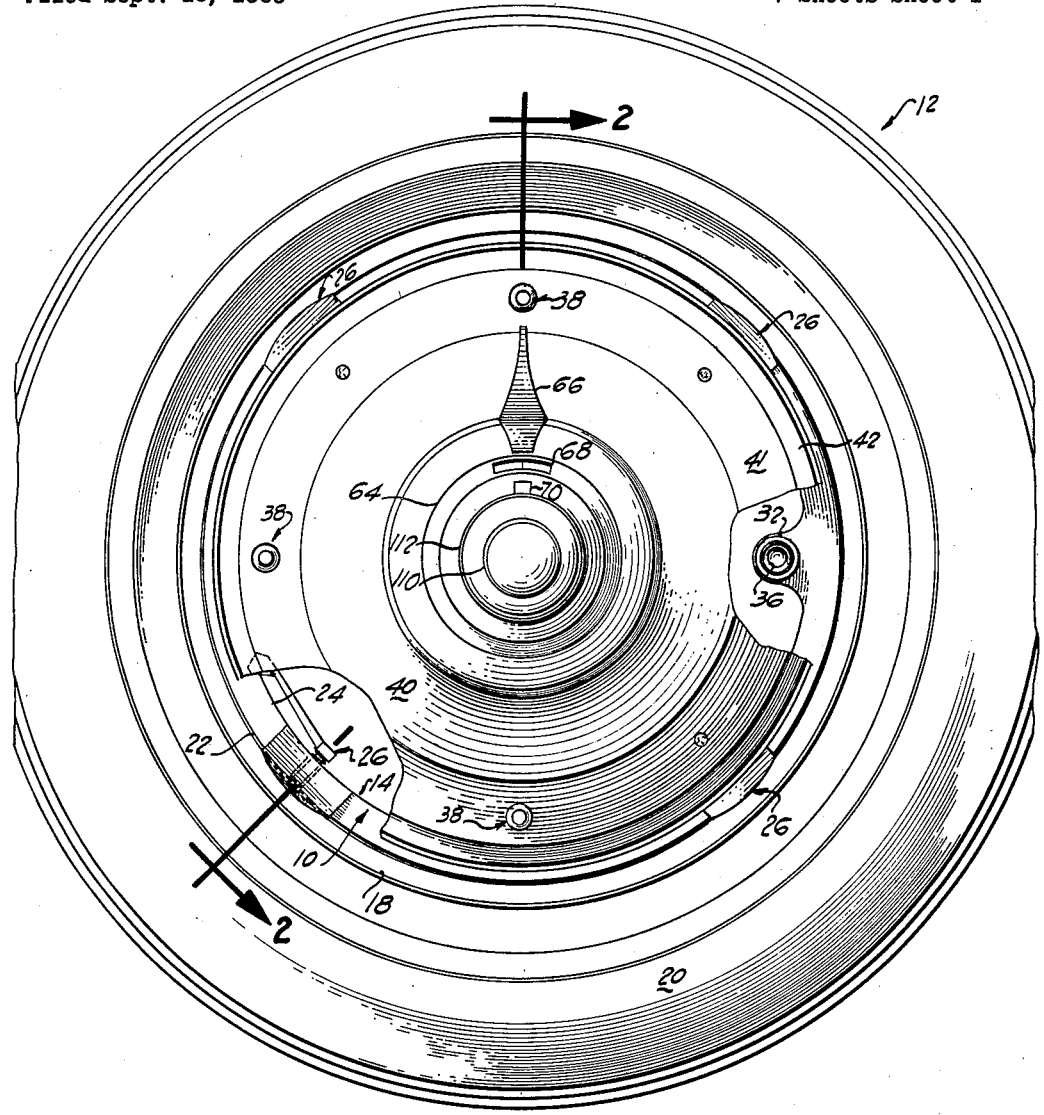
FIG. 1 is a front elevational view illustrating the balancer of the present invention mounted on a wheel.
Figure 3:
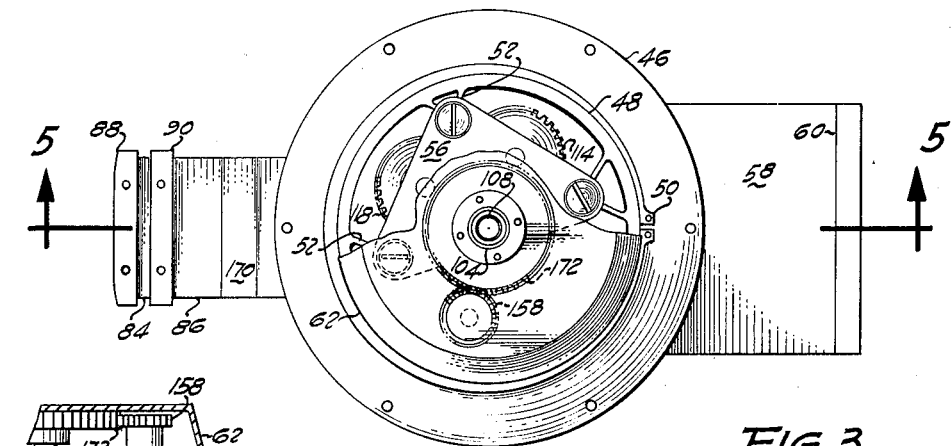
FIG. 3 is a sectional view of the balancer assembly taken generally along the line 3—3 in FIG. 2, with the balancer housings omitted.
Figure 6:
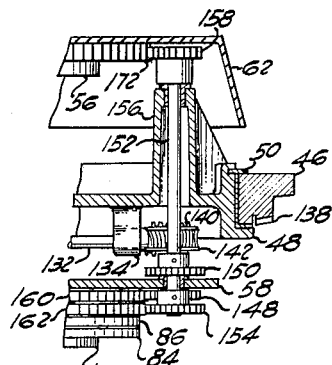
FIG. 6 is a fragmentary view in section of the indicating drum drive.

In FIGS. 1 and 2 a mechanical wheel balancer assembly 10 is shown mounted on an automobile wheel assembly 12 by means of a mounting ring 14.

The automobile wheel assembly 12 comprises a wheel 16 rotatably supported on an automobile and conventionally denominated as either a 13", 14" or 15" diameter wheel. The wheel 16 terminates in a bead rim 18 for engaging a tire 20, and a circumferential felly band portion 22 adjacent the rim 18 is engaged by the mounting ring 14.

The mounting ring 14 may be of the type described in Patent No. 2,929,598, issued to Pierce on Mar. 22, 1960, and comprises an annular frame 24 having a diameter somewhat less than the felly band portion of the wheel diameters noted above. The frame 24 is lockingly engaged with the wheel 16 by means of a plurality of spaced locking lever assemblies 26. Each lever assembly comprises a locking screw 28 threaded through the frame 24 and operated by a locking lever 30 to press a hardened steel point on the end of the screw 28 into the felly band portion 22 for clamping the ring to the wheel.

A plurality of spaced posts 32 project from the frame 24 outwardly of wheel 16 in a horizontal direction, and each has a central insert 34 in which a slot is formed. The slot receives a cross pin 36 of a spring biased bayonet type lock assembly 38, which is rotated in one direction to engage the lock assembly to the post and rotated to align the pin with the slot for disengaging the lock assembly. The bayonet lock assembly 38 is carried by the wheel balancer assembly 10 and locks the balancer assembly to the ring 14.

The balancer assembly 10 comprises a conical shaped housing 40 having a central opening. An outer circular rim 41 on housing 40, in which the push button assemblies 38 are seated, terminates in a peripheral end flange 42 overlapping the posts 32 to prevent accidental engagement of a foreign object with the posts. The second pan-like housing 44, spaced from housing 40 and having an end flange fastened to the circular rim 41, nests between the posts 32.

Figure 5:
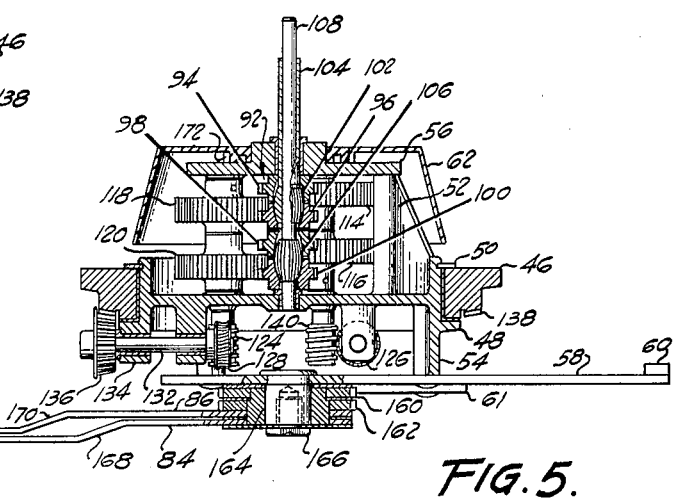
FIG. 5 is a sectional view taken along the line 5—5 in FIG. 3.
Figure 4:
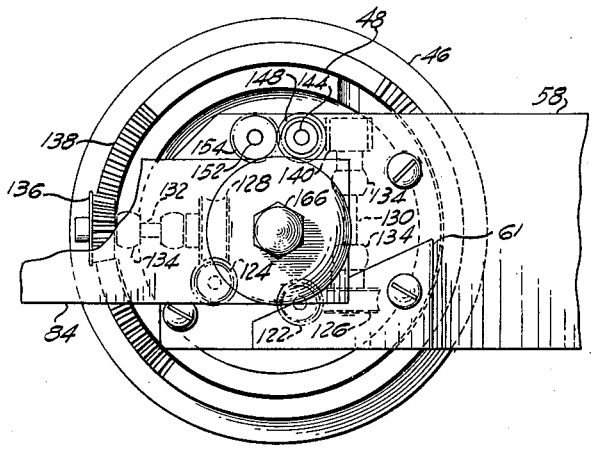
FIG. 4 is a sectional view of the balancer assembly taken generally along the line 4—4 in FIG. 2.
Figure 10:
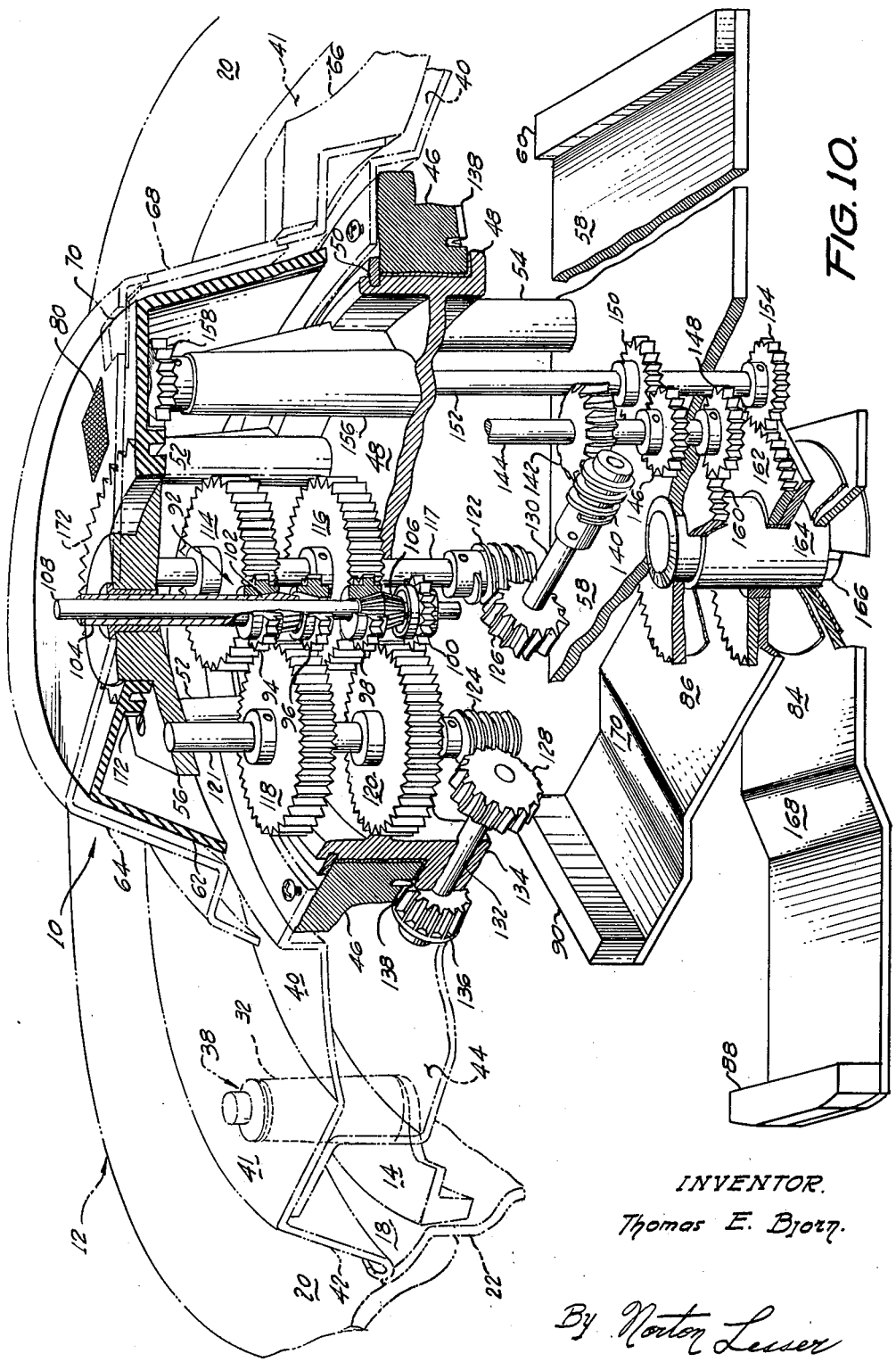
FIG. 10 is an isometric drawing of the balancer in partial section illustrating the coaction of the balancer gear trains with certain of the parts displaced somewhat for easier viewing.
Figure 11:
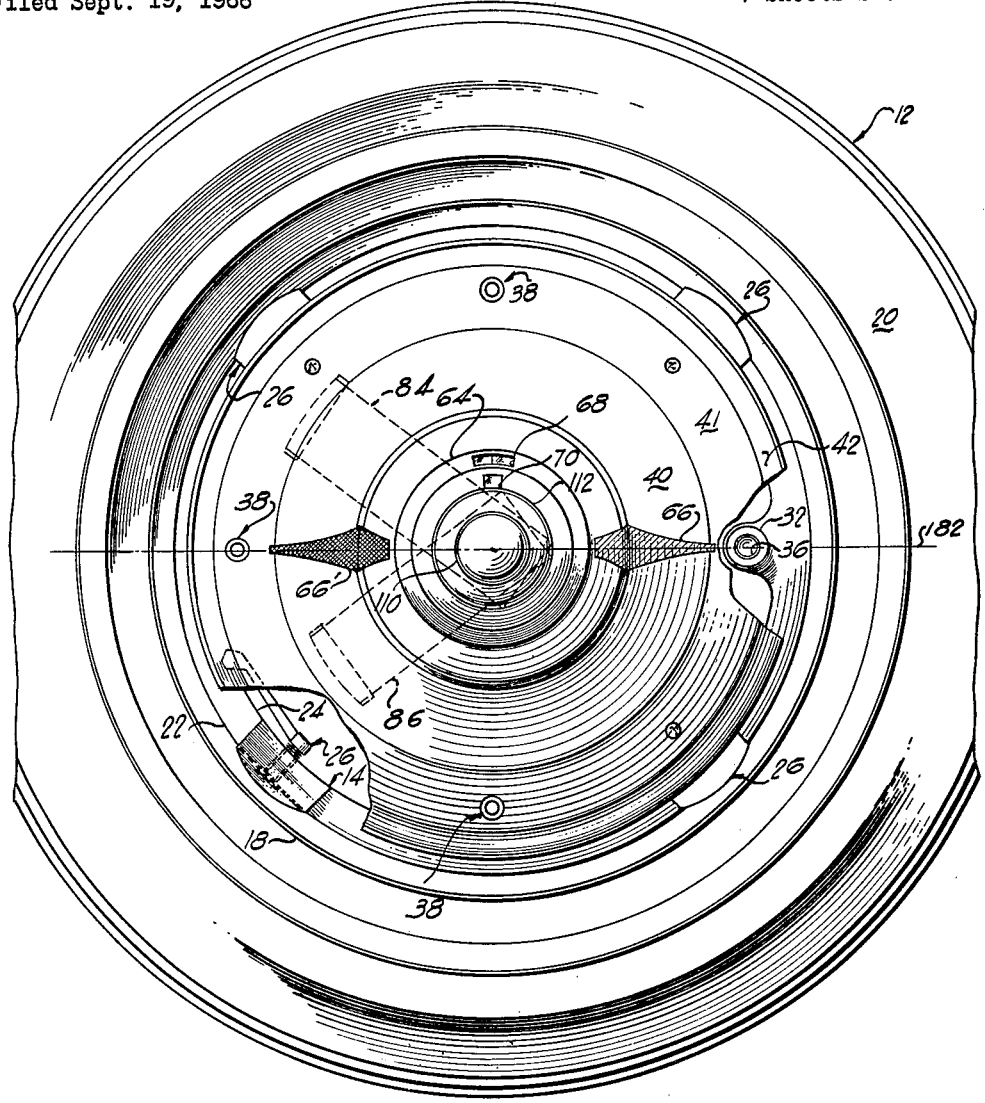
FIG. 11 is a front elevational view illustrating a second embodiment balancer mounted on a wheel, having substantially the mechanical construction of the balancer of FIGS. 1 through 10.
Figure 12:
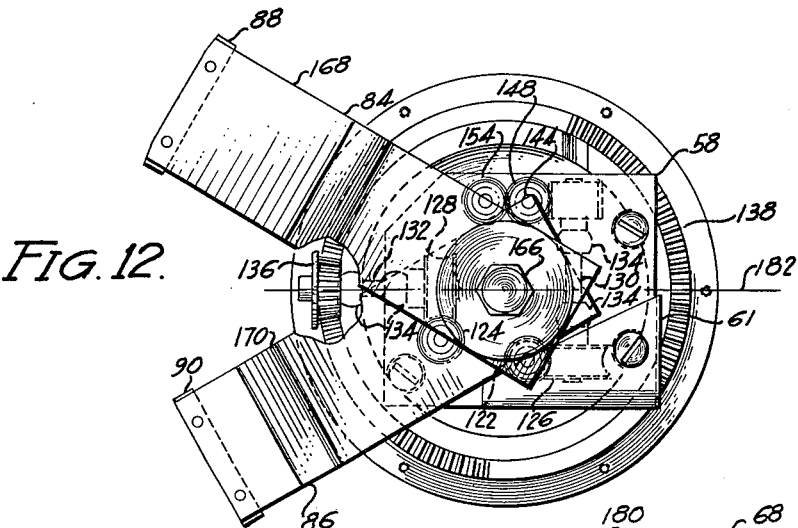
FIG. 12 is a sectional view of the balancer of FIG. 11 taken generally along a line corresponding to the line 4—4 in FIG. 2 of the first embodiment showing the elimination of the fixed weight assembly.

A support plate 46 is fastened to the margin of the central opening in housing 40. The support plate 46 has a circular opening in which a bearing plate 48 is journalled with the bearing plate 46 being held against axial movement by a flange at one end and a C-ring 50 at the other end as best seen in FIGS. 5 and 10. The bearing plate 48 has a plurality of posts 52 projecting from one surface thereof, and a plurality of posts 54 extending from the opposite surface. The posts 52 support a plate 56, and the posts 54 support a counterweight or weight plate 58, whose center of mass is substantially offset from the central horizontal axis of plates 48 and 56. The weight plate 58 has a weight 60 at one end thereof for increasing the moment of the plate 58. This extends the range of unbalanced condition of the wheel 16 which may be detected by the balancer. A trapezoidally shaped plate 61 seen in FIG. 4 is attached to weight 58 in order to compensate for unbalance introduced by the components of the balancer.

The plate 56 rotatably carries a cup-shaped, plastic indicating drum 62, and fixedly carries a cup-shaped pointer housing 64 with the indicating drum 62 nested in the housing 64. The pointer housing 64 has a pointer 66 extending radially therefrom. The pointer 66 is aligned with the central radial axis of weight plate 58, and is rotatable with plates 48, 56 and 58 relative housing 40 and wheel 16 for indicating the location of the unbalance relative wheel 16.

Pointer housing 64 is provided with a pair of windows 68 and 70. Seen through window 68 are a plurality of annular scales 72, 74 and 76 concentric to the axis of the balancer and carried by the flange portion of the indicating drum 62. The scales correspond to respective different diameters of wheel 16 and are printed on a scale strip 77. The drum 62 is actually formed as a truncated cone and the scales on strip 77, as seen in FIG. 9, are developed as respective arcs conforming to the respective diameters of the adjacent portions of the drum flange when strip 77 is secured thereto. For convenience in reading, the wheel 16, balancer 10 and the window 68 may be rotated from whatever position they are in to bring the window 68 to the top and place the relevant portion of the scales in a generally horizontal plane, as seen for example from FIG. 2. A hairline 78 across the window 68 and aligned with pointer 66 permits facile selection of the proper indication on one of the scales 72, 74 or 76. Additional spaced markings 80 and 82 corresponding to between 1½ and 2 ounces of unbalance are provided on the back of drum 62 as best seen in FIG. 8. Markings 80 and 82 are seen through window 70 at the back of housing 64 for the purpose of providing the operator with a quick indication of the most often used resultant weight for scanning the unbalance condition of wheel 16.

The scales 72, 74 and 76 provide an indication of the correction weight to be applied to respective diameter wheels in accordance with the ounce inches represented by a resultant weight necessity to balance the wheel 16. The resultant weight is controlled by the angular position of a pair of adjustable weight arms 84 and 86 carrying respective weights 88 and 90. The weight plate 58 and the weight arms 84 and 86 are rotatably adjusted relative the housing 42 and wheel 16 and relative to each other by a manually operable cone clutch assembly 92, best seen in FIGS. 5 and 10.

The cone clutch assembly 92 comprises a set of four axially-spaced gears 94, 96, 98 and 100 between plates 50 and 56. Gears 94 and 96 are engaged alternately by a cone clutch 102 in response to axial movement in a respective direction of a shaft 104 journalled in plate 56. Gears 98 and 100 are engaged alternately by a cone clutch 106 in response to axial movement in a respective direction of a shaft 108 journalled in shaft 104. Both shafts 104 and 108 extend through the pointer housing 64 with shaft 108 extending beyond shaft 104. Knurled handles or knobs 110 and 112 are provided for ease in manipulating the shafts 108 and 104, respectively, as seen in FIG. 2. It will be noted that the inner knob 112 is of considerably larger diameter than knob 110. The diameter of knob 112 is substantially 2¾″ as against 1½″ for knob 110 so that an operator's hand may freely reach over knob 110 to grasp knob 112 without moving knob 110.

Gears 94 and 98 engage with respective axially-spaced gears 114 and 116 located on a shaft 117 journalled in plates 48 and 56. Gear 114 is journalled on shaft 117 and operates only to rotate an adjacent gear 118 in response to the operation of gear 94 by clutch 102. Gear 116 is pinned to shaft 117 and rotates the shaft 117 in one direction responsive to the operation of gear 98 by its cone clutch 106.

Gears 96 and 100 engage with respective axially-spaced gears 118 and 120 carried on another shaft 121 journalled in plates 48 and 56. Gear 118 is pinned to shaft 121 to rotate the shaft in one direction in response to the operation of gear 96 by cone clutch 102 and in the opposite direction in response to rotation by gear 114. Gear 120 is journalled on shaft 121 and only rotates gear 116 and shaft 117 in a direction opposite to the direction in which gear 116 is rotated by gear 98.

The shafts 117 and 121 rotated by gears 116 and 118 respectively protrude through plate 48 and carry respective double-threaded worm gears 122 and 124 on the protruding end. Worm gears 122 and 124 engage respective worm wheels 126 and 128 carried on a respective shaft 130 and 132 journalled in respective posts 134 on the bearing plate 48.

Shaft 132 carries a bevelled pinion gear 136 for engagement with a bevelled ring gear 138 formed on the adjacent surface of plate 46 which is attached to housing 40. When housing 40 is rotating with wheel 16, the angular position of the plates 48, 56 and 58, and the indicating drum 62 carried by plate 56 are adjusted relative to the central axis of housing 40 and wheel 16 by axial movement of shaft 104 to engage either gears 94 or 96 and cause gears 118, 124, 128 and 134 to rotate in respective directions for moving the plates and drum in a desired direction.

The shaft 130 carries a double-threaded worm gear 140 for engagement with a worm wheel 142. Wheel 142 is carried on a shaft 144 journalled in plates 48 and 58. The shaft 144 carries a pair of gears 146 and 148 spaced on opposite sides of weight plate 58. The tandem connection of worm gears and wheels 122, 126, 140 and 142 of course provides a considerable gear reduction in the available space.

Gear 146 engages an adjacent gear 150 carried on an elongate shaft 152 to drive gear 150 and shaft 152 in the opposite direction from gears 146 and 148. One end of shaft 152 extends through plate 58 and carries gear 154 located adjacent and below gear 148. The other end of shaft 152 extends through a post 156 on plate 48 and carries a gear 158 nested in a circular recess of drum 62.

The gears 148 and 154 engage respective large diameter, coaxially-arranged gears 160 and 162. Gear 162 is attached to weight arm 86 for rotating arm 86 and is journalled on a hub 164 which connects gear 160 to a weight arm 84 to rotate arm 84. Hub 164 in turn is journalled on a spindle projecting from plate 58 and a thrust nut and washer 166 holds the gears and weight arms in position. Gears 160 and 162 rotate in opposite directions due to the opposite rotational directions of gears 148 and 154 to in turn move the weight arms 84 and 86 towards or away from each other dependent on the direction in which the gears are rotated by wheel 140.

The weight arms 84 and 86 have respective offset portions 168 and 170 intermediate their respective ends. The offset portions 168 and 170 serve to bring the center of mass of the respective weight arm and respective weight 88 and 90 in a common radial plane, while still permitting rotation of the weights 88 and 90 past each other in a full 360° arc. The weights 88 and 90 concentrate the mass towards the outer portion of the radial plane where the effect thereof is enhanced.

Gear 158 on the end of shaft 152 opposite gear 154 engages a ring gear 172 integrally formed on the wall of the recess in indicator drum 62 so that the drum rotates with gears 150, 154 and 158 for indicating the resultant weight produced by changes in the angular positions of weights arms 84 and 86 relative to the plate 58 and the pointer 66.

The three circumferential scales 72, 74 and 76 on drum 62 are calibrated for indicating respective correction weights corresponding to an unbalance condition in ounces for wheels of respective 13″, 14″ and 15″ diameter. The 13″ diameter scale can also be used for 12″ diameter wheels with minor allowance and the 15″ scale can also be used for 16″ wheels with allowance for the increased diameter.

The scales seen through window 68 have respective graduations and characters offset from each other in accordance with each correction weight corresponding to the resultant weight produced when weight arms 84 and 86 are set in any particular angular position. The ratio of the spacing between increments on the scales varies in accordance with the wheel diameter ratios so that spacings on the 13″ diameter scals 72 are 13⁄14 those of the 14″ diameter scale 74, which in turn are 14⁄15 of the 15″ diameter scale 76.

The resultant weight corresponds to the rotational force vectors produced by weight arms 84 and 86 against the rotational force vector of the weight plate 58. When the two arms 84 and 86 are aligned with each other and 180° away from plate 58 the resultant vectors of the three plates correspond to zero on the scales. Since any angular change in position of the arms 84 and 86 from that position produces a comparatively small change in the resultant vector, the spacings between adjacent increments in that portion of the scale is large. When the arms 84 and 86 are approximately 90° from the plate 58, vector changes are greater and the incremental spacings on the scales are correspondingly reduced. When the arms 84 and 86 are aligned with each other and the weight 58, corresponding to a position of maximum resultant weight, changes in the angular position of the arms 84 and 86 again produce small changes in the resultant weight or vector and the spacing between increments on the scales again increase in correspondence therewith.

The background of the scales is marked with one color in area 174 extending for about ½ ounce on opposite sides of the zero mark for providing a quick indication to the operator of the near-balanced or balanced condition. A differently colored area occupies the remainder of the background indicated at area 176 to provide a quick indication of a large unbalance condition.

As seen in FIGS. 8 and 9 the scales are calibrated in the same increments on opposite sides of the zero mark. These increments terminate at 180° from the zero mark since the maximum resultant weight produced by arms 84 and 86 will occur when they are 180° from the center line of weight plate 58 and the corresponding portions of scales 72, 74 and 76 appear in window 68 instead of the zero mark. The maximum resultant weight corresponds to substantially 7½ ounces of unbalance for a 15″ wheel as indicated by the corresponding correction weight on scale 76 and somewhat smaller correction weight values on scales 72 and 74.

To balance the wheel 16, it is conventionally raised from the supporting surface. The mounting ring 14 is attached to the wheel 16 usually before the wheel is raised. The assembly 10 is attached to the posts 32 by operation of the push button assemblies 38. Both the ring 14 and balancer assembly 10 are given a substantial axial tug to ensure that they are securely locked in position. The wheel 16 is rotated rapidly, after it is raised, either with a wheel spinner or through the vehicle drive to rotate assembly 10 therewith.

Since the unbalance condition of most wheels does not exceed 3 or 4 ounces, the operator will likely choose to scan the wheel with a resultant weight of 1½ to 2 ounces. He pulls or pushes the small knob 110 and shaft 108 to cause cone clutch 106 to engage with either gears 98 or 100. This actually holds the engaged gear 98 or 100 stationary and causes the associated gear 116 or 120 to rotate relative thereto due to the rotation of balancer 10. Gears 116 and shaft 117 are therefore rotated in respective directions depending on whether gear 98 or 100 is engaged with clutch 106, for rotating gears 122, 126, 140, 142, 146, 148, 150, 154, 158, 160 and 162 in respective directions. It will be noted that the tandem connection of worm gear 122, wheel 126, worm gear 140 and wheel 142, all carried on rotatable plate 48, permits a large velocity reduction to be achieved between gears 98 and 100 and the oppositely rotatable weight arms 84 and 86 in a minimum of space.

Gears 160 and 162, of course, rotate in opposite directions dependent on the direction of rotation of gear 116 under control of either gear 96 or 100 to rotate weight arms 84 and 86 either towards or away from each other until the operator, by simply observing the window 70, notes that one of the red flags or indicators 78 appears stationary in the window 70. Weights 88 and 90 are then positioned so as to correspond to a 1½ to 2 ounces resultant weight, which is used for scanning the wheel to locate the position of the unbalance weight.

The operator now releases knob 110 and conveniently reaches thereover to grasp knob 112 and pull or push shaft 104 to engage cone clutch 102 with either gear 94 or 96. This holds one of the gears 94 or 96 stationary to rotate the associated gear 114 or 118. Gear 118 rotates in a direction dependent on whether gear 94 or 96 is engaged. Gear 118 in turn drives the gears 124, 128 and 136 relative the ring gear 138 on plate 46, the balancer housing 40 and the wheel 16. The plate 58 together with weight arms 84 and 86 therefore move as a unit relative the axis of the balancer until the operator detects a minimum vibration. It will be noted that the resultant weight of 1½ to 2 ounces defined by the position of weights 88 and 90 relative to each other has been used for scanning the wheel 16. The location of the unbalance position relative the wheel 16 at the position of minimum vibration is given by the pointer 66.

As the correct unbalance weight may not yet be accurately determined, the operator again manipulates knob 110 and shaft 108. He now manipulates shaft 108 to either increase or decrease the resultant weight defined by the angular spacing between weights 88 and 90 until he senses a further reduction in vibration. This informs him that the resultant weight corresponds to the actual unbalance weight of the wheel. Of course, if the operator believes the sensed vibration is still too high, he may again manipulate shaft 104 to define more accurately the location of the unbalance and follow this procedure with further refinement of the resultant weight. It will be noted that the direction in which the operator usually chooses to move the plate 58 or the weight 84 and 86 is dependent on the direction in which he thinks he will most easily achieve a balance condition. The choice of the initial scanning weight is, of course, variable and depends on what weight the operator believes most closely corresponds to the unbalance condition of the wheel.

The operator, after he has detected the lowest level of vibration, stops the wheel 16. To accurately read the correction weight in ounces on the appropriate one of the scales 72, 74 or 76, he may manually rotate the wheel until the pointer 66 is located along the vertical axis of the wheel and is pointing upwardly. This places the window 68, the hairline 78 and the appropriate portion of the scales 72, 74 and 76 in a generally horizontal plane where they may be more easily read and without the necessity of the operator maintaining his eye level at the level of the scales. After reading the correction weight and noting the position of the pointer, he thereafter adds a corresponding weight to the wheel 16 in the appropriate position.

Reference is now made to FIGS. 11 through 14 for a second embodiment of a balancer incorporating teachings of this invention. The balancer is substantially identical from a mechanical standpoint as that shown in FIGS. 1 through 10 except that the nonrotatable or fixed weight arm 58 and weight 60 are removed. Two pointers 66 and 66' of different physical appearance, preferably different colors, are used along with a different form of scale strip 77 used for the balancer readout. In all other regards the balancer of this embodiment is the same as the balancer of FIGS. 1 through 10 and hence further description of its working parts will not be given.

The balancer 12' is constructed to be a balanced mechanism with the arms 84, 86 removed and if rotated about its central axis would provide no unbalanced forces. The two weight arm assemblies 84, 86 are so constructed that they provide equal unbalance forces along a radius extending through their center mass when the device is rotated about its central axis. Thus, as the weight assemblies 84, 86 are rotated in opposite directions at equal angular speed with respect to the housing 40, a resultant or effective balance force is created along a vector summation path indicated by the line 182 in FIG. 12 passing normally through the axis of rotation of the balancer.

As the weight assemblies 84, 86 cycle through complete circles of revolution the effective balance force passes through two maximum values and two minimum values or zeros. The two maximum values occur when the two weight arm assemblies 84, 86 are aligned with each other on the same side of the axis of revolution of the balancer either on the left side or the right side as viewed in FIG. 12. The two minimum values are reached under the two conditions when the weight arm assemblies 84, 86 are exactly opposite each other, one condition of which would be when weight arm assembly 84 is on the top and 86 on the bottom as viewed in FIG. 12 with the other occurring when weight arm assembly 86 is on the top and weight arm 84 on the bottom. Thus, as the weight arms pass through a full cycle the effective balance force value passes through two cycles with the locus of the effective force shifting exactly 180° as the effective force passes through its minimum values.

Figure 13:
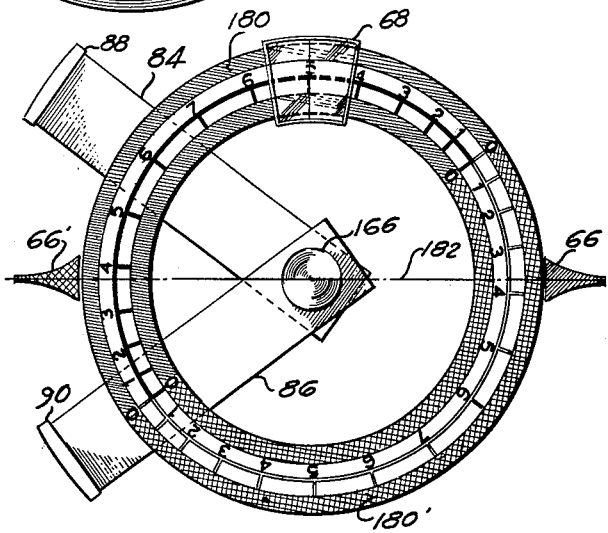
FIGS. 13 and 14 are schematic diagrams showing the relationship between the weight arm positions, the two indicating pointers and the scale indicator.
Figure 14:
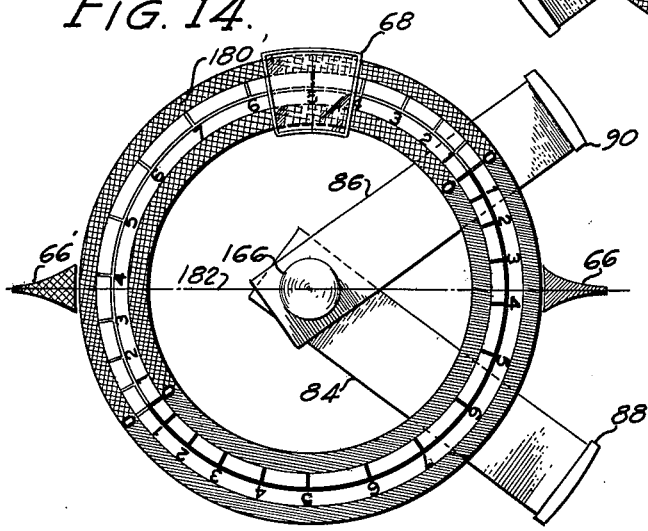

The two different colored pointers 66 and 66' are provided on the pointer housing 64 (FIG. 11) to indicate the proper locus of unbalance since the effective balance force created by the weight arms 84, 86 can appear on either side of the balancer axis of rotation along the line 182. A scale strip 180 surrounds the indicator drum 62 which has two full scales each of which extends halfway around the scale strip from one minimum or zero mark through a maximum to the other minimum. As shown in FIGS. 13 and 14, the two scales on the scale strip are of different colors corresponding to the two different colors of the pointers 66 and 66' and are arranged to indicate the use of pointer 66 when the same colored scale 180 is viewed through window 68 and indicates the use of pointer 66' when its colored scale 180' is in view.

The wheel is balanced in accordance with the procedures outlined in the description of the first embodiment until minimum vibration is achieved. The operator reads the amount and color from the scale 180 or 180′ through window 68 and places a weight in accordance with the value indicated at a location indicated by the pointer corresponding to the color appearing through the window 68.

Thus, the balancer of this embodiment includes all of the important features of the first, including the features of fully cyclical action which prevents the operator controls from being wrenched out of the operator's hand at certain limiting conditions as present in some prior art devices. It is fully useful through out each full cycle of weight arm rotation in spite of the apparent ambiguities created by the elimination of the fixed weight.

There is an advantage in the embodiment shown in FIGS. 11 through 14 over balancers of the type shown in FIGS. 1 through 10 in that all couples arising from the balance arms are eliminated while the ease of operation resulting from the fully cyclical operation is maintained. As may be seen in FIG. 2, a substantial couple is presented as the balancer 10 rotates with the vehicle wheel 12 because of the axial displacement between the fixed weight arm 58 and the two movable weight arm assemblies 84, 86. The couple caused by the axially displaced weight assemblies provides a wobble force which can be quite substantial and perhaps dangerous at the extreme condition when the two rotatable weight assemblies 84, 86 are diametrically opposite the fixed weight assembly 58 as shown in FIG. 2, especially at high speed balancer operation.

The balancer of FIGS. 11 through 14 eliminates the couple or wobble forces since the two weight arm assemblies 84, 86 have their balancing forces operate in the same radial plane (as they are so arranged in the first embodiment). Since they do not act against a fixed weight which is axially displaced from this plane of action, no couples are produced by the balancer.

Another advantage of the balancer of FIGS. 11 through 14 is that it is easier and less costly to fabricate. Besides the obvious reduction in material required, a difficult problem in balancing the device within itself is eliminated. The balancing forces in operation in the device are complicated because of the mass times radial distance factors in determining the balancing forces. With the elimination of the fixed weight it is much easier to balance the two movable weight arms with respect to each other without having to take into account their total balancing force with respect to a fixed weight. Since the device is easier to balance a substantial cost in fabrication is eliminated.

The foregoing constitutes a description of two preferred embodiments of mechanical wheel balancers, whose inventive concepts are believed set forth in the appended claims.

What is claimed is:

1. A mechanical wheel balancer comprising a housing for attachment to a rotatable wheel having any one of a plurality of different diameters, a pair of weight arms of different lengths, a weight on the end of each arm, means for journaling said weight arms for continuous rotation in the same direction relative to said housing and journaling said weight arms for continuous opposite rotation relative to said housing for providing a resultant weight to compensate for an unbalance weight on said wheel, a plurality of scales each individual to a different diameter wheel and operable responsive to the position of said weight arms relative to each other for indicating a correction weight for a respective wheel diameter corresponding to the respective resultant weight compensating the unbalance weight in a wheel of said respective diameter, and an offset portion in each weight arm for locating the center of mass of each weight arm and its respective weight in a common radial plane while permitting said weight arms to rotate past each other.

2. A mechanical wheel balancer comprising a housing for attachment to a rotatable wheel having any one of a plurality of different diameters, one weight carried by said housing, means journaling said one weight for continuous rotation relative to said housing, a pair of weight arms carried by said one weight, means journaling said weight arms for continuous rotation relative said one weight, a plurality of gears, a manually operable clutching assembly carried from said housing for rotation with said one weight for selecting any one of said plurality of gears and for driving said selected one gear in a selected one of two directions, a first worm gear and worm wheel assembly controlled by the selected one gear for rotating said one weight relative to said housing, a second manually operable clutching assembly carried from said housing for rotation with said one weight for selecting another one of said plurality of gears and for driving said other selected one gear in a selected one of two directions, a pair of tandemly connected worm gear and worm wheel assemblies rotatably carried with said one weight controlled by the other selected gear for rotating said pair of arms in opposite directions independently of said one weight with the velocity of said other selected gear being substantially greater than the velocity of said arms, an offset portion in each weight arm for strengthening the respective arm and for maintaining the center of mass of each weight arm and its respective weight in a common radial plane while permitting said weight arms to rotate past each other, means for indicating the position of said one weight relative said housing, an indicating drum rotatable with said pair of arms, and a plurality of scales on said drum for indicating the unbalance weight corresponding to the identical position of said arms for each of said plurality of different diameter wheels.

3. A device for determining the amount and locus of unbalance in a rotatable wheel comprising a housing fixedly attachable to said wheel for rotation therewith about the axis of said wheel, counterbalance weight means movably carried by said housing, means for cyclically moving said weight means with respect to said housing to adjust its effective weight along a line normal to said axis through two maximum and two minimum values for each complete cycle of movement, means for rotating said weight means with respect to said housing to adjust the position of the effective weight with respect to the locus of unbalance in the wheel, first and second unbalance locus pointers, means mounting said pointers in alignment with said line on opposite sides of said axis for movement with said weight means as said weight means moves with respect to said housing, indicia means operable with said effective weight adjusting means for indicating the amount of unbalance in the wheel, and means associated with said indicia means for indicating the pointer to be used in determining the locus of unbalance in the wheel.

4. A device for determining the amount and locus of unbalance in a rotatable wheel comprising a housing fixedly attachable to said wheel for rotation therewith about the axis of said wheel, a pair of weight assemblies producing equal radial balance forces about said axis when rotated about said axis by said wheel, means for continuously rotating said weights in opposite directions at equal speeds with respect to said housing, means for rotating said weight assemblies with respect to said housing, first and second unbalanced locus pointers, each positioned in alignment with one of the aligned positions of said weight assemblies, and means operable with said weight assembly moving means for indicating the pointer to be used in determining the locus of unbalance in the wheel.

5. A device for balancing a rotatable wheel comprising a housing fixedly attachable to said wheel for rotation therewith about the axis of said wheel, a pair of weight assemblies producing equal radial balance forces about said axis when rotated about said axis by said wheel, means for continuously rotating said weight assemblies in opposite directions at equal speeds with respect to said housing, means for rotating said weight assemblies with respect to said housing, each of said weight assemblies comprising a weight arm and a weight at the end of said arm, said arm having an offset portion to locate the center of mass of said weight and said arm in a common radial plane.

References Cited

UNITED STATES PATENTS

| | | | |
|---|---|---|---|
| 3,241,395 | 3/1966 | Voller et al. | 51—169 |
| 3,094,003 | 6/1963 | Hemmeter | 73—458 |
| 2,972,256 | 2/1961 | MacMillan | 73—458 |
| 2,954,699 | 10/1960 | Hemmeter | 73—458 |
| 2,780,939 | 2/1957 | Kellogg | 73—458 |
| 2,779,196 | 1/1957 | Hemmeter | 73—458 |
| 2,675,200 | 4/1954 | Wohlforth | 73—458 |
| 2,662,396 | 12/1953 | Hunter | 73—458 |
| 2,241,637 | 5/1941 | Ernst et al. | 73—470 |

CHARLES A. RUEHL, Primary Examiner

H. GOLDSTEIN, Assistant Examiner